United States Patent
Utin

(10) Patent No.: US 7,487,350 B2
(45) Date of Patent: Feb. 3, 2009

(54) FIXED CLIENT IDENTIFICATION SYSTEM FOR POSITIVE IDENTIFICATION OF CLIENT TO SERVER

(75) Inventor: Daniil Utin, Needham, MA (US)

(73) Assignee: Grand Virtual, Inc., Cambridge, MA (US)

( * ) Notice: Subject to any disclaimer, the term of this patent is extended or adjusted under 35 U.S.C. 154(b) by 117 days.

(21) Appl. No.: 10/532,542

(22) PCT Filed: Oct. 23, 2003

(86) PCT No.: PCT/US03/33509

§ 371 (c)(1),
(2), (4) Date: Nov. 17, 2005

(87) PCT Pub. No.: WO2004/040408

PCT Pub. Date: May 13, 2004

(65) Prior Publication Data

US 2006/0156014 A1     Jul. 13, 2006

Related U.S. Application Data

(60) Provisional application No. 60/421,285, filed on Oct. 25, 2002.

(51) Int. Cl.
| | |
|---|---|
| H04L 9/00 | (2006.01) |
| H04L 9/32 | (2006.01) |
| G06F 11/30 | (2006.01) |
| G06F 12/14 | (2006.01) |
| G06F 7/04 | (2006.01) |
| G06F 17/30 | (2006.01) |
| G06K 9/00 | (2006.01) |
| H03M 1/68 | (2006.01) |
| H04K 1/00 | (2006.01) |
| H04N 7/16 | (2006.01) |

(52) U.S. Cl. ............... 713/165; 713/165; 713/170; 713/187; 713/190; 726/2; 726/3; 726/5; 726/6; 726/18; 726/26; 380/255; 380/278

(58) Field of Classification Search ............... 713/165, 713/170, 190, 187; 726/2, 3, 5, 18, 26; 380/258, 380/277
See application file for complete search history.

(56) References Cited

U.S. PATENT DOCUMENTS

| | | | |
|---|---|---|---|
| 5,050,212 A * | 9/1991 | Dyson ............... | 713/187 |
| 6,711,682 B1 | 3/2004 | Capps | |
| 6,971,018 B1 * | 11/2005 | Witt et al. ............... | 713/187 |
| 7,082,615 B1 * | 7/2006 | Ellison et al. ............ | 726/26 |
| 7,213,266 B1 * | 5/2007 | Maher et al. ............. | 726/26 |
| 7,234,157 B2 * | 6/2007 | Childs et al. ............. | 726/2 |
| 2002/0116515 A1 | 8/2002 | Hashimoto | |
| 2002/0120861 A1 | 8/2002 | Kagiwada et al. | |
| 2002/0197985 A1 | 12/2002 | Tourrilhes et al. | |
| 2003/0084291 A1 | 5/2003 | Yamamoto et al. | |

* cited by examiner

Primary Examiner—Shin-Hon Chen
(74) Attorney, Agent, or Firm—Fish & Richardson P.C.

(57) ABSTRACT

A tamperproof ClientID system to uniquely identify a client machine is invoked upon connection of a client application to a backend. Upon initial connection, the backend issues a unique ClientID containing a checksum. The client-application prepares at least two different scrambled versions of the ClientID and stores them in respective predetermined locations on the client machine. Upon subsequent connection to the backend, the client application retrieves and unscrambles the values at the two locations, verifies the checksums and compares the values. If the checksums are both correct and the values match, the ClientID value is sent to the backend, otherwise the client application sends an error code.

10 Claims, 2 Drawing Sheets

FIXED CLIENT IDENTIFICATION SYSTEM FOR POSITIVE IDENTIFICATION OF CLIENT TO SERVER

CLAIM OF PRIORITY

This application claims priority under 35 USC 119(e) to U.S. patent application Ser. No. 60/421,285 filed on Oct. 25, 2002, the entire contents of which are incorporated by reference.

TECHNICAL FIELD

This invention relates to security applications, and more particularly to identification of a user's computer.

BACKGROUND

Identification of a particular client computer system used for accessing a server is useful in secure applications where positive identification is desirable. In the past, systems for identifying client computers, browser cookies, for example, have had less than satisfactory capability of resisting tampering.

SUMMARY

A ClientID uniquely identifying a client machine is issued by the backend and stored on the client's machine upon first client application connection to the backend. On all subsequent connections, the client application retrieves the ClientID and sends it back to the backend. The ClientID mechanism includes features that make it very difficult for the user to remove or change the ClientID once it is set. In particular, according to the invention, this is accomplished by having the client application store at least two different scrambled versions of the ClientID in two separate locations in the client machine. Upon subsequent connection to the backend, the client application attempts to retrieve and unscramble the values at the two locations.

In the preferred embodiment, during the ClientID storage process, the backend generates a ClientID initially that contains a checksum and transmits it to the client application upon initial connection to the backend. The client application uses a first key to scramble the ClientID generating a first scrambled ClientID that is stored in the first predetermined location, for example the registry. A second key is used by the client application to produce a second scrambled version of the ClientID that is stored in the second predetermined location, for example the system configuration file.

Upon subsequent connection of the backend, a retrieval process is invoked in which the client application retrieves the values at each location, unscrambles them using the respective keys, tests their checksums for verification, and compares the unscrambled values. If the checksums are both correct and the unscrambled values match, the retrieved ClientID is transmitted to the backend. Otherwise, the client application sends an appropriate error code to the backend.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

ClientID is a special tag that uniquely identifies the client machine. Initially, the ClientID is generated by the backend and stored on client's machine upon first client application connection to the backend. On all subsequent connection, client application retrieves the ClientID and sends it back to the backend. Unlike browser cookies, the ClientID mechanism includes some special tamper-proof features that make it very difficult for the user to remove or change the ClientID once it is set.

Figure 1:
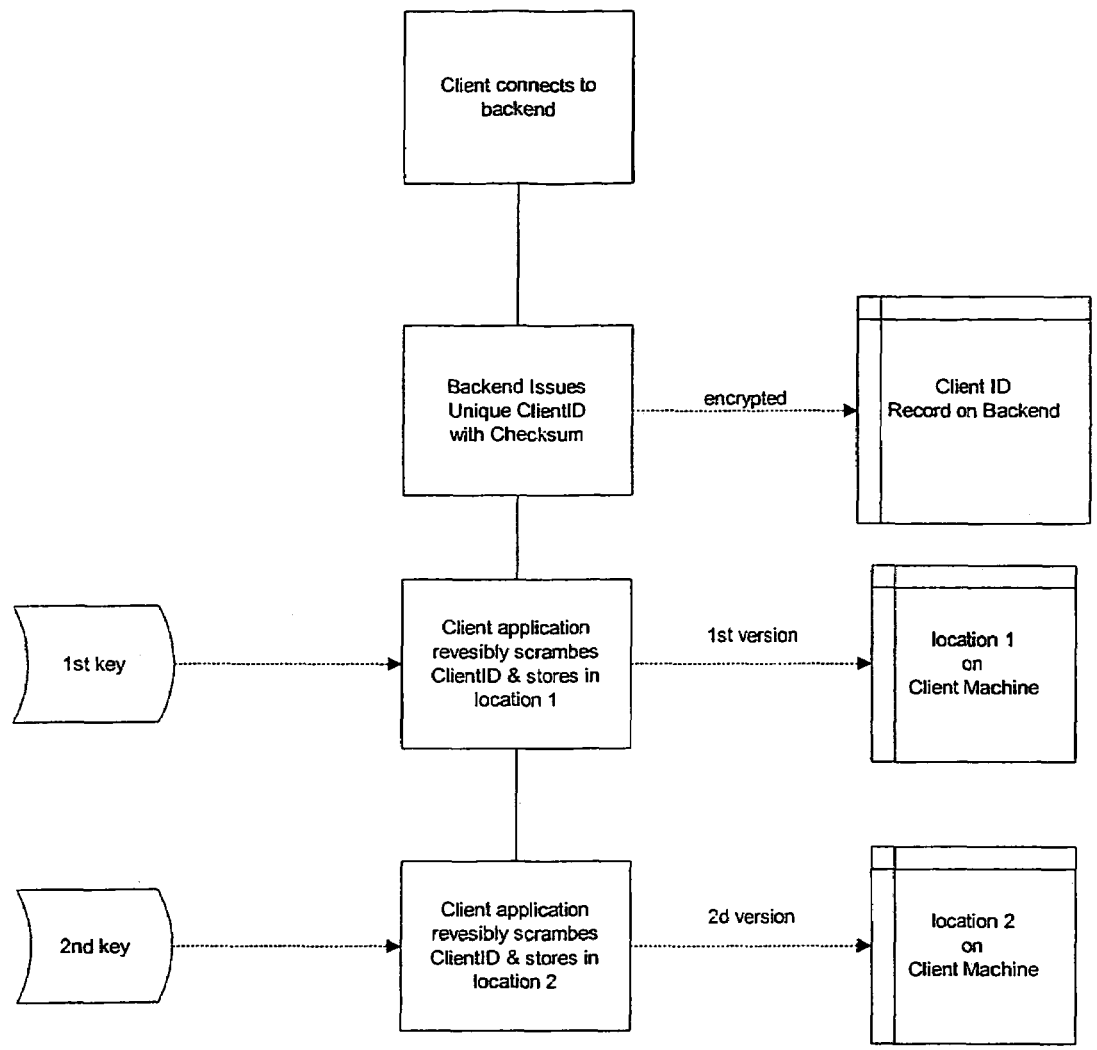
FIG. 1 is a flow and block diagram of the ClientID storage process.

Note: ClientID remains on the client's machine even after the client application is uninstalled. ClientID installation/retrieval occurs as a part of the client application startup process, as shown in FIG. 1, described in more detail below.

ClientID Storage Process

ClientID is stored in at least two undisclosed locations on the client machine (for example, in the registry and system configuration file). As shown in FIG. 1, the ClientID value is encrypted on the backend and contains a checksum. The client application has an ability to verify whether the checksum is correct. This makes ClientID tampering much more difficult. In addition, prior to storing the ClientID in these two locations, the ClientID in each location is reversibly scrambled by the client application with two different keys. This makes it impossible to find the second ClientID location even if someone learns the first location and performs a search based on a value stored in the first location.

ClientID Retrieval Process

Figure 2:
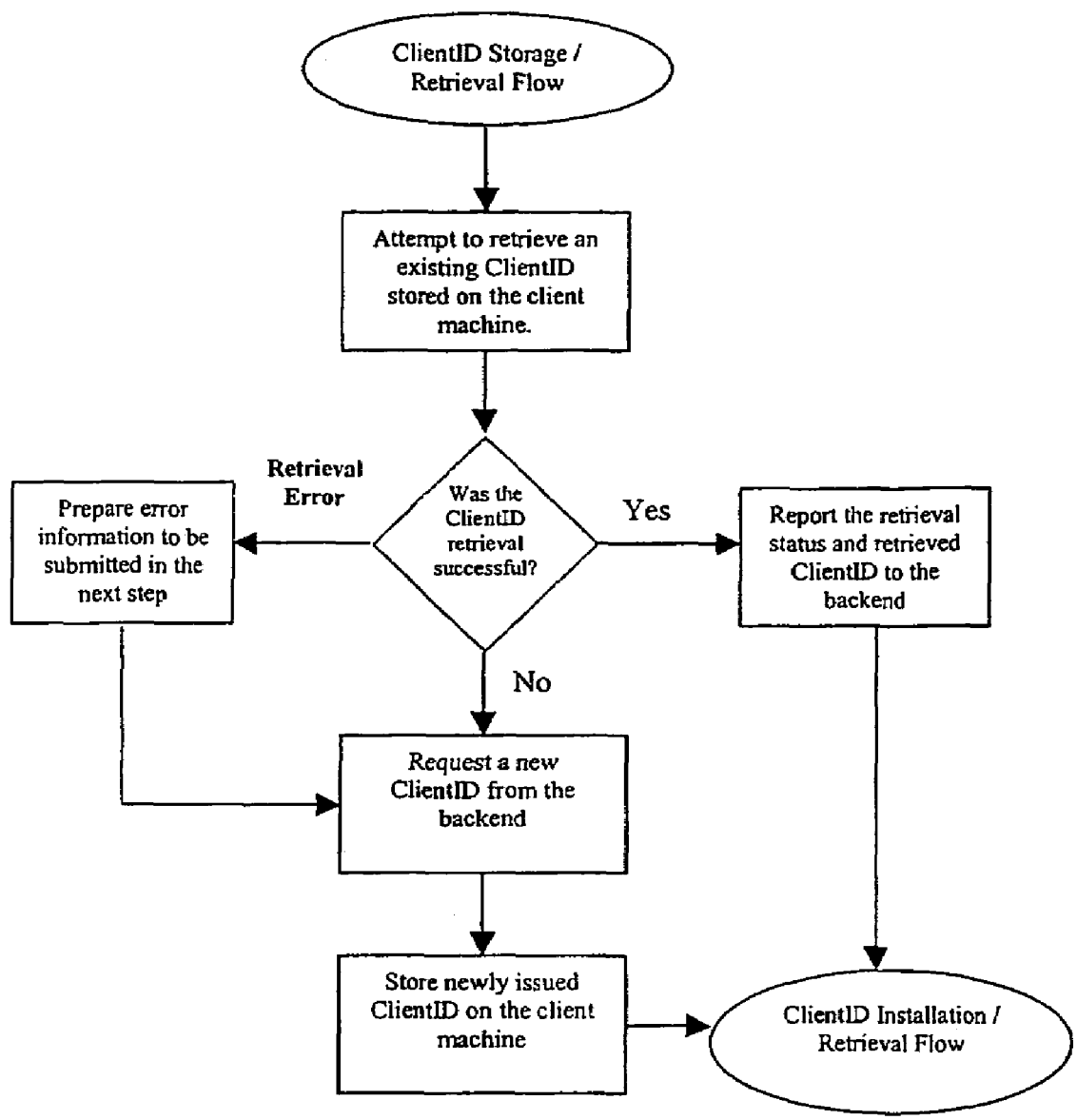
FIG. 2 is a flow diagram of the ClientID retrieval process.

In the beginning of the ClientID retrieval process shown in FIG. 2, the client application attempts to retrieve and unscramble the values stored in both locations. Then it attempts to verify and compare these two values (if any were found).

All possible retrieval outcomes are listed below. Only the first two can be considered "normal", that is, should occur as a part of regular software usage. All other cases indicate that either someone is tampering with the ClientID mechanism or an Operating System malfunction/data corruption has occurred.

a. ClientID is not found in either of the two locations. This would normally happen when the software is started for the first time on the client machine. Action: request a new ClientID from the backend.

b. ClientID is found in both locations. The two values have a correct checksum and match each other. This should happen on the second and all subsequent client application launches. Action: report retrieved ClientID value to the backend.

c. ClientID is found in only one location. The value at that location has a correct checksum. Action: report retrieved ClientID to the backend along with error code #1 (see below for details)

d. ClientID is found in both locations. Only one value has a correct checksum. Action: report retrieved ClientID from the correct location to the backend along with error code #2 and a value from the other location.

e. ClientID is found in both locations. The two values have a correct checksum but do not match each other. Action:

report retrieved ClientID value from the first location to the backend along with error code #3 and a value from the second location.

f. ClientID is found in both locations. Values from both locations fail the checksum verification. Action: request a new ClientID from the backend, report error code #4 and values from both locations.

g. ClientID is found in only one location. The value at that location fails the checksum verification. Action: request a new ClientID from the backend, report error code #5 and a value from that location.

In cases c. through g. an error code along with some optional data is reported to the backend. That information is logged on the backend and, in conjunction with other data, like user IP, can be invaluable in detecting fraudulent activity. In cases c. through e. the error code and optional data are stored in the supplied ClientID record. In cases f. and g. that information is stored in the newly generated ClientID record.

A number of embodiments of the invention have been described. Nevertheless, it will be understood that various modifications may be made without departing from the spirit and scope of the invention. For example, more than two scrambled versions can be stored in respective locations. Accordingly, other embodiments are within the scope of the following claims.

What is claimed is:

1. A method for storing data to positively identify a client machine running a client application to a backend, comprising:

executing a ClientID storage process, including
   upon connection by the client application to the backend, generating a unique ClientID containing a checksum at the backend for the client machine,
   sending the ClientID to the client application,
   reversibly scrambling the ClientID with the client application at the client machine and storing a first scrambled version of the ClientID at a first predetermined location on the client machine, and
   reversibly scrambling the ClientID with the client application at the client machine and storing a second scrambled version different from the first version of the ClientID at a second predetermined location on the client machine; and executing a ClientID retrieval process with the client application when the client application subsequently attempts to connect to the backend, including
   retrieving the first and second scrambled versions of the ClientID stored in the first and second locations and unscrambling the first and second scrambled versions of the ClientID using first and second keys to obtain first and second unscrambled values,
   running a checksum operation on each of the first and second unscrambled values to verify that each has the correct checksum, and
   comparing the first and second unscrambled values to determine an occurrence of a match between the first and second unscrambled values.

2. The method of claim 1, wherein the retrieval process further comprises:
   if the first and second unscrambled values retrieved from the first and second locations have the correct checksum and match each other, reporting the retrieved ClientID to the backend.

3. The method of claim 2, wherein the retrieval process further comprises:
   if the first and second unscrambled values retrieved from the first and second locations lack the correct checksum and match each other, reporting an error to the backend.

4. The method of claim 1, wherein the storage process further comprises encrypting a value of the generated ClientID at the backend and storing the encrypted value of the ClientID on the backend in a ClientID record.

5. The method of claim 1, wherein the first and second keys are different.

6. The method of claim 1, wherein one of the first and second locations is a registry.

7. The method of claim 1, wherein one of the first and second locations is a system configuration file.

8. The method of claim 1, wherein the first and second locations are a registry and a system configuration file.

9. A system comprising:
   a client machine connected to a backend, wherein
   upon connection by a client application to the backend, the backend is configured to generate a unique ClientID containing a checksum for the client machine and send the ClientID to the client machine;
   the client machine is configured to reversibly scramble the ClientID with the client application and store a first scrambled version of the ClientID at a first predetermined location on the client machine, the client machine is further configured to reversibly scramble the ClientID with the client application and store a second scrambled version different from the first scrambled version of the ClientID at a second predetermined location on the client machine and
   a ClientID retrieval process executed by the client application as the client application subsequently attempts to connect to the backend, the ClientID retrieval process is configured to retrieve the first and second scrambled versions of the ClientID stored in the first and second locations and unscramble the first and second scrambled versions of the ClientID using first and second keys to obtain first and second unscrambled values, the ClientID retrieval process is further configured to execute a checksum operation on each of the first and second unscrambled values to verify that each has the correct checksum, and compare the first and second unscrambled values to determine a state of matching between the first and second unscrambled values.

10. The system of claim 9, wherein the retrieval process is further configured to report the retrieved ClientID to the backend if the first and second unscrambled values have the correct checksum and match each other.

* * * * *

UNITED STATES PATENT AND TRADEMARK OFFICE
CERTIFICATE OF CORRECTION

PATENT NO. : 7,487,350 B2  Page 1 of 1
APPLICATION NO. : 10/532542
DATED : February 3, 2009
INVENTOR(S) : Daniil Utin It is certified that error appears in the above-identified patent and that said Letters Patent is hereby corrected as shown below:

Title page, item [57] Col. 2 (Abstract), Line 4: After "client" delete "-"

Column 4, Line 38: In Claim 9, delete "machine" and insert -- machine; and --

Signed and Sealed this

Thirty-first Day of March, 2009

JOHN DOLL
*Acting Director of the United States Patent and Trademark Office*